FLY BAIT COMPOSITIONS CONTAINING DIOCTYL PHTHALATES

Bernard F. Beaver, St. Louis, and Warren O. Haberman, Webster Groves, Mo., assignors to Ralston Purina Company, St. Louis, Mo., a corporation of Missouri
No Drawing. Filed June 22, 1962, Ser. No. 204,591
4 Claims. (Cl. 167—48)

This invention relates to fly baits and more particularly to fly baits consisting of an insecticidal component and a fly attractor.

Briefly, the present invention provides fly baits which include an insecticide and an octylphthalate. The combination of these components may be applied to a solid base or carrier.

Among the objects of this invention are the provision of improved fly baits; the provision of fly baits which effectively attract flies; the provision of fly baits containing an attractor and an insecticide which are compatible; and the provision of fly baits which may be easily prepared from readily available materials. Other objects and features will be in part apparent and in part pointed out hereinafter.

The invention accordingly comprises the products hereinafter described, the scope of the invention being indicated in the following claims.

The fly baits customarily employed consist of an insecticide, a solid base or carrier such as granulated sugar, large crystals of sugar, oyster shells, crushed granite, etc., and taste attractors such as powdered milk, powdered sugar, etc. Other adjuvants, such as dyes and flow agents are also employed.

Among the insecticides previously utilized in fly baits are Malathion and DDVP (O,O-dimethyl-2,2-dichlorovinyl phosphate). Both of these are effective insecticides for flies. With DDVP which is used at small levels (0.2 to 0.5%) a liquid ingredient is desirable to dissolve DDVP so that it may be dispersed in a uniform film over the surfaces of the base particles. The film can then be treated with natural attractive substances such as powdered milk and powdered sugar which will adhere to the film and absorb the liquid, resulting in a dry product. This is particularly important because DDVP is a volatile material which volatilizes rather quickly from the surface of a base particle leaving the product ineffective.

In accordance with the present invention it has been found that the dioctyl phthalates are not only solvents for DDVP but surprisingly these phthalates possess a great attractiveness for flies. Accordingly, fly baits containing a dioctyl phthalate attract flies to the bait where they may be killed by the insecticidal component of the bait. Furthermore, the solubility of DDVP in the dioctyl phthalates retains the DDVP in the bait to function as a component lethal to flies. These properties are shared by the various isomeric dioctyl phthalates, and mixtures of the isomers as well as commercial dioctyl phthalates may be employed.

To demonstrate the attractiveness of a dioctyl phthalate to adult house flies, the following tests were conducted. Into screen cages 10" x 10" x 12" were placed 1¾ gram samples of plain sugar and of the respective mixtures. Each cage contained approximately two hundred adult house flies. The number of flies present at the bait container or in its immediate vicinity were counted at five minute intervals.

| Percent DOP [1] | Percent Sugar | Minutes | | | |
|---|---|---|---|---|---|
| | | 5 | 10 | 15 | 20 |
| 0 | 100 | [2] 39 | 43 | 39 | 41 |
| ½ | 99½ | 45 | 67 | 77 | 74 |
| 0 | 100 | 45 | 67 | 74 | 71 |
| 1 | 99 | 62 | 102 | 112 | 119 |
| 0 | 100 | 30 | 39 | 38 | 47 |
| 2 | 98 | 50 | 77 | 96 | 104 |
| 0 | 100 | 20 | 13 | 18 | 16 |
| 4 | 96 | 33 | 45 | 51 | 59 |
| 0 | 100 | 29 | 49 | 43 | 46 |
| 6 | 94 | 37 | 64 | 71 | 78 |

[1] Dioctyl phthalate.
[2] Number of flies counted.

The dioctyl phthalates are compatible with and aid the action of an insecticide such as DDVP. This was illustrated by the following tests in which bait cups containing 1¾ grams of bait were placed on the floor in the center of a screen cage 10" x 10" x 12". In each experiment approximately two hundred and fifty adult house flies were employed.

PRODUCT (FLY BAIT—SUGAR BASE)

| Formulation | No. of Flies at Bait, Minutes | | | | | | |
|---|---|---|---|---|---|---|---|
| | 1 | 2 | 3 | 4 | 5 | 10 | 40 |
| DDVP, 0.35% | 1 | 10 | 19 | 26 | 27 | 51 | 157 |
| DDVP, 0.35%; DOP, 1.65% | 16 | 21 | 21 | 30 | 37 | 57 | 187 |
| DDVP, 0.35% (Heated at 55° C. for 24 hours) | 12 | 25 | 21 | 33 | 38 | 52 | 83 |
| DDVP, 0.35%; DOP, 1.65% (Heated at 55° C. for 24 hours) | 25 | 71 | 89 | 53 | 112 | 137 | 238 |

To further test the effectiveness of the combination of dioctyl phthalates and DDVP, a room test was carried out. In this test, bait was exposed on 12" diameter aluminum pans on the floor of a room 18' x 15' x 9' containing free flying house flies. Tests were run with each of the two following compositions on each of two different days. The following results were secured:

PRODUCT (FLY BAIT—SUGAR BASE)

| | No. Dead Flies, 1st Day | No. Dead Flies, 2nd Day |
|---|---|---|
| DDVP, 0.35% (Heated at 55° C. for 24 hours) | 2,436 | 700 |
| DDVP, 0.35%; DOP, 1.65% (Heated at 55° C. for 24 hours) | 4,875 | 1,290 |

The following examples illustrate the invention:

Example 1

A fly bait was prepared using a sugar base, consisting of granulated sugar, to which was added a mixture of .35% DDVP and 1.65% di-2-ethyl hexyl phthalate, both by weight. The resulting composition was an effective fly bait which attracted flies and simultaneously killed them when they came close to the bait.

Example 2

Example 1 was repeated but the di-2-ethyl hexyl phthalate was replaced with di-2-methyl heptyl phathalate. The resulting composition was an effective fly bait which attracted flies and also killed them when they came close.

As indicated above, the sugar base for the bait may be replaced in whole or in part by other solid bases or carriers. The DDVP may be replaced in whole or in part with other insecticides and the composition may contain other adjuvants such as powdered milk, powdered sugar, dyes, etc.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

What is claimed is:

1. A fly bait comprising a solid base, an insecticide on said base and an unsubstituted octyl phthalate on said base.
2. A fly bait comprising a sugar base and a composition on said base, said composition including an insecticidal component and an unsubstituted octyl phthalate.
3. A fly bait comprising a solid sugar base and a composition on said base, said composition comprising a solution of O,O-dimethyl-2,2-dichloro-vinyl phosphate in di-2-ethyl hexyl phthalate.
4. A fly bait comprising a solid sugar base and a composition on said base, said composition comprising a solution of O,O-dimethyl-2,2-dichloro-vinyl phosphate in di-2-methyl heptyl phthalate.

References Cited in the file of this patent

UNITED STATES PATENTS 3,056,723     Galloway _____ Oct. 2, 1962

FOREIGN PATENTS 1,194,983     France _____ Nov. 13, 1959

OTHER REFERENCES

Kilpatrick et al.: J. of Economic Entomology, October 1955, vol. 48, No. 5, pages 623–624.